United States Patent
Rathnavelu et al.

(10) Patent No.: US 9,443,001 B2
(45) Date of Patent: *Sep. 13, 2016

(54) METHOD AND SYSTEM TO CURATE MEDIA COLLECTIONS

(71) Applicant: RealNetworks, Inc., Seattle, WA (US)

(72) Inventors: Kadir Rathnavelu, Bellevue, WA (US);
Christine McKee, Seattle, WA (US);
David Miller, Bellevue, WA (US);
Alastair Sutherland, Seattle, WA (US);
Chris Petersen, Seattle, WA (US);
Surya Subbiah, Redmond, WA (US)

(73) Assignee: REALNETWORKS, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/709,372

(22) Filed: May 11, 2015

(65) Prior Publication Data

US 2015/0317380 A1 Nov. 5, 2015

Related U.S. Application Data

(63) Continuation of application No. 13/681,324, filed on Nov. 19, 2012, now Pat. No. 9,031,953.

(51) Int. Cl.
*G06F 17/30* (2006.01)
*G06K 9/00* (2006.01)

(52) U.S. Cl.
CPC ... *G06F 17/30598* (2013.01); *G06F 17/30247* (2013.01); *G06F 17/30268* (2013.01); *G06F 17/30867* (2013.01); *G06K 9/00288* (2013.01)

(58) Field of Classification Search
CPC ................................. G06F 17/00; G06F 17/30
See application file for complete search history.

(56) References Cited

U.S. PATENT DOCUMENTS

| | | | | |
|---|---|---|---|---|
| 6,389,181 B2* | 5/2002 | Shaffer | ............. | H04N 1/00132 358/403 |
| 7,213,027 B1* | 5/2007 | Kominek | .......... | G06F 17/30899 |
| 7,676,500 B2* | 3/2010 | Kominek | .......... | G06F 17/30899 707/999.107 |
| 7,949,671 B2* | 5/2011 | Kominek | .......... | G06F 17/30899 707/761 |
| 7,991,840 B2* | 8/2011 | Boyer | .............. | G06F 17/30 707/608 |
| 8,122,057 B2* | 2/2012 | Kominek | .......... | G06F 17/30899 707/706 |
| 8,260,859 B2* | 9/2012 | Boyer | .............. | G06F 17/30 707/608 |
| 8,412,740 B2* | 4/2013 | Kominek | .......... | G06F 17/30899 707/791 |
| 8,533,192 B2* | 9/2013 | Moganti | .......... | G06F 17/30265 707/737 |
| 8,578,000 B2* | 11/2013 | Van Wie | ........... | A63F 13/12 709/220 |
| 8,620,951 B1* | 12/2013 | He | ................ | G06F 17/30734 707/608 |

(Continued)

*Primary Examiner* — Farhan Syed
(74) *Attorney, Agent, or Firm* — AEON Law; Adam L. K. Philipp

(57) ABSTRACT

Disclosed is a service which obtains media directly from users and from online sources, which obtains events and anniversaries from online sources, which obtains location and date information associated with photographs, which dynamically provides users with a selection of automatically curated collections of photographs based on the then-current location of the user, based on and relevant to personal and publicly recognized anniversaries and holidays (with dates obtained directly from the users and from online sources), based on specific people or locations associated with dates, events, and anniversaries, and which presents intelligently organized location-based collections which can be quickly re-organized by a user.

18 Claims, 9 Drawing Sheets

(56) References Cited

U.S. PATENT DOCUMENTS

| | | | | |
|---|---|---|---|---|
| 8,650,283 | B1* | 2/2014 | Chang | H04N 21/25875 709/224 |
| 8,655,881 | B2* | 2/2014 | Moganti | G06F 17/30038 345/633 |
| 8,666,978 | B2* | 3/2014 | Moganti | G06Q 10/0875 345/633 |
| 8,812,482 | B1* | 8/2014 | Kapoor | G06F 17/30578 379/114.14 |
| 8,868,589 | B2* | 10/2014 | Kominek | G06F 17/30899 707/761 |
| 8,875,172 | B1* | 10/2014 | Chang | H04N 21/2665 725/109 |
| 9,031,953 | B2* | 5/2015 | Rathnavelu | G06F 17/30247 707/737 |
| 2003/0085868 | A1* | 5/2003 | Paul | B41J 2/17503 345/156 |
| 2003/0089781 | A1* | 5/2003 | Kia | B41J 2/17503 235/462.15 |
| 2003/0094492 | A1* | 5/2003 | Kia | B41J 2/17503 235/454 |
| 2003/0094496 | A1* | 5/2003 | Kia | B41J 2/17503 235/472.01 |
| 2007/0050413 | A1* | 3/2007 | Kominek | G06F 17/30899 |
| 2008/0133658 | A1* | 6/2008 | Pennington | H04L 67/1095 709/204 |
| 2008/0304808 | A1* | 12/2008 | Newell | G06F 17/30029 386/278 |
| 2008/0306995 | A1* | 12/2008 | Newell | G06F 17/30265 |
| 2009/0089254 | A1* | 4/2009 | Von Kaenel | G06F 17/30241 |
| 2010/0146085 | A1* | 6/2010 | Van Wie | A63F 13/12 709/220 |
| 2010/0223300 | A1* | 9/2010 | Kominek | G06F 17/30899 707/803 |
| 2011/0191330 | A1* | 8/2011 | Barve | G06F 17/30 707/723 |
| 2011/0191331 | A1* | 8/2011 | Barve | G06F 17/30 707/723 |
| 2011/0191332 | A1* | 8/2011 | Barve | G06F 17/30 707/723 |
| 2011/0208509 | A1* | 8/2011 | Kominek | G06F 17/30899 704/9 |
| 2011/0270833 | A1* | 11/2011 | von Kaenel | G06F 17/30241 707/736 |
| 2012/0067954 | A1* | 3/2012 | Moganti | H04N 5/232 235/451 |
| 2012/0069131 | A1* | 3/2012 | Abelow | G06Q 10/067 348/14.01 |
| 2012/0072419 | A1* | 3/2012 | Moganti | G06F 17/30038 707/737 |
| 2012/0072420 | A1* | 3/2012 | Moganti | G06F 17/30265 707/737 |
| 2012/0072463 | A1* | 3/2012 | Moganti | G06Q 30/0276 707/803 |
| 2012/0197632 | A1* | 8/2012 | Kominek | G06F 17/30899 704/9 |
| 2012/0265758 | A1* | 10/2012 | Han | G06F 17/30038 707/737 |
| 2013/0013650 | A1* | 1/2013 | Shum | G06F 17/30525 707/805 |
| 2013/0238649 | A1* | 9/2013 | Shum | G06F 17/30292 707/758 |
| 2013/0246560 | A1* | 9/2013 | Feng | H04L 67/06 709/217 |
| 2013/0290110 | A1* | 10/2013 | LuVogt | G06F 17/30 705/14.66 |
| 2013/0346405 | A1* | 12/2013 | Davis | G06F 17/3012 707/736 |
| 2014/0006408 | A1* | 1/2014 | Rae | G06F 17/278 707/740 |
| 2014/0025680 | A1* | 1/2014 | Moganti | G06F 17/30014 707/737 |
| 2014/0040712 | A1* | 2/2014 | Chang | G06F 17/212 715/202 |
| 2014/0047016 | A1* | 2/2014 | Rao | H04L 67/22 709/203 |
| 2014/0052442 | A1* | 2/2014 | Kominek | G06F 17/30899 704/235 |
| 2014/0172864 | A1* | 6/2014 | Shum | G06F 19/322 707/740 |

* cited by examiner

METHOD AND SYSTEM TO CURATE MEDIA COLLECTIONS

CROSS-REFERENCE TO RELATED APPLICATIONS

This application claims the benefit of priority to U.S. Non-Provisional patent application Ser. No. 13/681,324; filed Nov. 19, 2012; titled METHOD AND SYSTEM TO CURATE MEDIA COLLECTIONS; and naming inventors Kadir RATHNAVELU, Christine MCKEE, David MILLER, Alastair SUTHERLAND, Chris PETERSEN, and Surya SUBBIAH. The above-cited application is hereby incorporated by reference, in its entirety, for all purposes.

BACKGROUND INFORMATION

Digital photography makes it possible for people to take hundreds, even thousands, of digital photographs, without the time and expense of developing negatives and prints from film. However, organizing a large volume of digital photographs has become a challenge. Systems exist which organize digital photographs by date, by categories assigned by users, or by faces detected in photographs. Examples of such systems include Apple, Inc.'s IPHOTO® software application and Google, Inc.'s PICASA® photo service, and Facebook, Inc.'s FACEBOOK® social media service.

However, these systems and services do not dynamically and automatically provide users with curated collections of photographs relevant to the then-current location of the user nor based on and relevant to personal and publicly recognized anniversaries and holidays (with dates obtained directly from the users and from online sources, such as social networks), nor based on specific people or locations associated with dates and events, nor do such services present intelligently organized location-based collections which users can re-organize and which then respond to the user's re-organization.

Needed is a system which addresses the shortcomings discussed above.

SUMMARY

Disclosed is a service which obtains media directly from users and from online sources, which obtains events and anniversaries from online sources, which obtains location and date information associated with photographs, which dynamically provides users with a selection of automatically curated collections of photographs based on the then-current location of the user, based on and relevant to personal and publicly recognized anniversaries and holidays (with dates obtained directly from the users and from online sources), based on specific people or locations associated with dates, events, and anniversaries, and which presents intelligently organized location-based collections which can be quickly re-organized by a user.

DETAILED DESCRIPTION

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Figure 1:
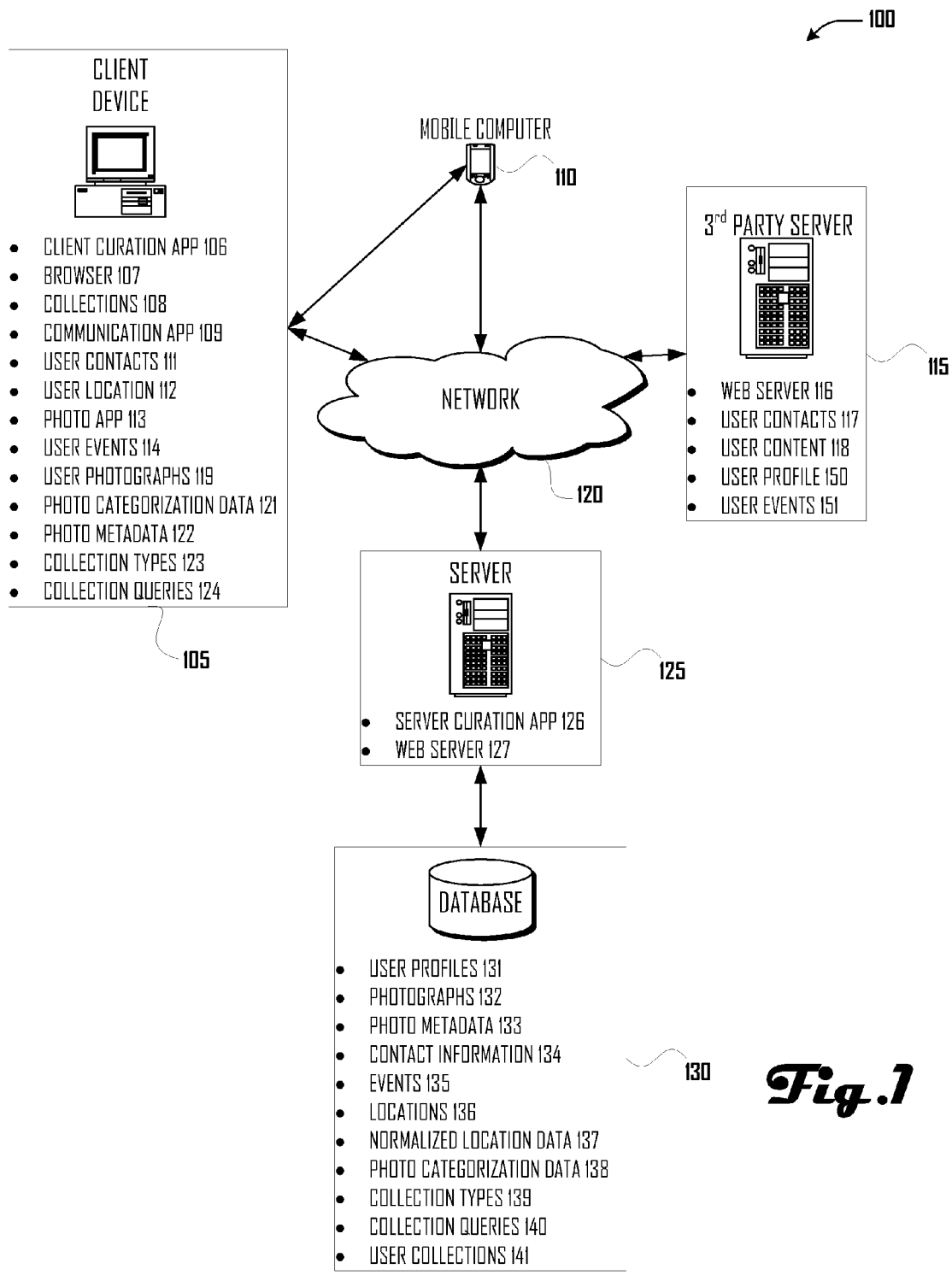
FIG. 1 is a network and device diagram illustrating exemplary computing devices configured according to embodiments disclosed in this paper.

FIG. 1 is a network and device diagram illustrating exemplary computing devices configured according to embodiments disclosed in this paper. In FIG. 1, a Server 125 is connected to a Network 120. The Network 120 may be a data network, such as the Internet. The Server 125 is illustrated as being connected to a Database 130. This paper discusses components as connecting to the Server 125 or to the Database 130; it should be understood that such connections may be to, through, or via the other of the two connected components (for example, a statement that a computing device connects with or sends data to the Server 125 should be understood as saying that the computing device may connect with or send data to the Server 125 and/or the Database 130). Although illustrated as separate components, the servers and databases may be provided by common (or separate) physical hardware and common (or separate) logic processors and memory components.

The Server 125 may execute software routines such as the Server Curation Application 126 (discussed herein) and the Web Server 127, which Web Server 127 may, for example, serve web pages and similar content to the Client Device 105.

The Server 125 may maintain a database, such as the Database 130, containing database entries or records with information comprising, for example, User Profiles 131, digitally encoded Photographs 132, Photo Metadata 133, Contact Information 134, Events 135, Locations 136, Normalized Location Data 137, Photo Categorization Data 138, Collection Types 139, Collection Queries 140, and User Collections 141. The database entries may be represented by a cell in a column or a value separated from other values in a defined structure in a database file. Though referred to herein as individual records or entries, the database entries may comprise more than one database entry (for example, concatenations and/or transformations of multiple cells). The database entries may be, represent, or encode integer or decimal numbers, binary values (including for data representing audio, visual, and other media), logical values, text, or similar.

As illustrated in FIG. 1, similar database entries may be found in the Client Device with the following entries being equivalent, except that entries on the Server may be associated with User Profiles 131 or other records to distinguish one user from another:

| data in Client Device | data in Server/Database |
| --- | --- |
| Collections 108 | User Collections 141 |
| User Contacts 111 | Contact Information 134 |
| User Location 112 | Locations 136 |
| User Events 114 | Events 135 |
| Photo Categorization Data 121 | Photo Categorization Data 138 |
| Photo Metadata 122 | Photo Metadata 133 |
| Collection Types 123 | Collection Types 139 |
| Collection Queries 124 | Collection Queries 140 |
| User Photographs 119 | Photographs 132 |

User Profiles 131 may comprise database entries for, for example, login credentials, identifiers associated with users and user accounts, subscription information, and user permissions. User Profiles 131 may be associated in the Database 130 with Photographs 132, Photo Categorization Data 138, Contact Information 134, Events 135, Locations 136, Collection Types 139, and Collection Queries 140.

Digitally encoded Photographs 132 and 150 may comprise, for example, database entries comprising photographs encoded in a digital format, such as a "raw" image file, a TIFF, JPEG, GIF, BMP, PNG, RGBE, IFF-RGFX, CGM, Gerber Format, SVG, and other digital image formats. Photographs 132 may be associated in the Database 130 with User Profiles 131, Photo Metadata 133, Events 135, Locations 136, Normalized Location Data 137, and Photo Categorization Data 138. Photographs 132 may include Photo Metadata 133. Discussion herein refers to "photographs," thought it would be understood that sequential images can be composed as videos and that references herein to "photograph" or "photographs" should be understood as also referring to videos.

Photo Metadata 133 may comprise database entries comprising camera settings, time and date (together referred to herein as a "time-stamp"), shutter speed, exposure (such as f-stop), image size (in pixels, distance units, or quantity of data), compression, camera name, camera type, all typically associated in the Database 130 with one or more Photographs 132 or found within database entries for one or more Photographs 132. Photo Metadata 133 may be formatted according to a standard, such as, for example, the International Press Telecommunications Council ("IPTC") Information Interchange Model, the IPTIC Core Schema for XMP, Extensible Metadata Platform ("XMP"), Exchangeable image file format ("Exif"), Dublin Core Metadata initiative, or Picture Licensing Universal System.

Contact Information 134 may comprise, for example, database entries representing or encoding names of people and organizations, addresses, phone numbers, email addresses, identifiers or public handles used to identify people and organizations in Online Services (defined herein), websites, URLs, and similar. Contact Information 134 may be stored in a standard data storage standard, such as, for example, the X.400, iCalendar, CalDAV, SyncML, vCard, Transport Neutral Encapsulation Format, OLE, and RTF standards. Contact Information 134 may be associated in the Database 130 with User Profiles 131, digitally encoded Photographs 132, Photo Categorization Data 138, Photo Metadata 133, Events 135, Locations 136, and Normalized Location Data 137. User Contacts 111 are an example of Contact Information 134 stored on the Client Device 105.

Events 135 may comprise database entries representing or encoding appointments, tasks, reminders, anniversaries (including personal anniversaries, such as birthdays, wedding anniversaries, and similar, as well as public anniversaries and holidays), names and/or locations of venues where an event will, is, or did take place, and names of people with whom an Event 135 is associated. Events 135 may be stored in a standard data storage standard, such as, for example, the X.400, iCalendar, CalDAV, SyncML, vCard, Transport Neutral Encapsulation Format, OLE, and RTF standards. Events 135 may be associated with User Profiles 131, Photographs 132, Photo Categorization Data 138, Photo Metadata 133, Contact Information 134, Locations 136, and Normalized Location Data 137. User Events 114 are an example of Events 135 as stored on the Client Device 105.

Locations 136 may comprise database entries representing or encoding addresses, coordinates, such as latitude, longitude, and elevation, and similar. Locations 136 may be stored in a standard data storage standard, such as, for example, the X.400 standard. Locations 136 may be associated with User Profiles 131, digitally encoded Photographs 132, Photo Categorization Data 138, Photo Metadata 133, Events 135, and Normalized Location Data 137. User Locations 112 are an example of Locations 136 as stored on and/or generated by the Client Device 105.

Normalized Location Data 137 may comprise, for example, database entries representing or encoding hierarchically structured location information (with smaller, more local, geographic units at one end of the hierarchy and larger, regional, geographic units at the other end of the hierarchy; as used herein, the "bottom," "small," "lower," or "local" end of the hierarchy shall refer to the end with smaller geographic units while the "larger," "top," or "regional" end of the hierarchy shall refer to the end with larger geographic units), such as for example, the following Table 1:

| level number | | |
| --- | --- | --- |
| 1 | coordinates: | 47°40'31.39" N 122°11'47.04" W |
| 2 | number: | 1218 |
| 3 | street: | Kirkland Avenue |

-continued

| level number | | |
|---|---|---|
| 4 | Neighborhood: | Moss Bay |
| 5 | City: | Kirkland |
| 6 | State: | WA |
| 7 | Country: | USA |
| 8 | Continent: | North America |

132, Photo Categorization Data 138, Photo Metadata 133, Contact Information 134, Events 135, Locations 136, and Normalized Location Data 137. Photo Categorization Data 121 is an example of Photo Categorization Data 138 as stored on the Client Device 105.

Collection Types 139 are types of Collections defined by Triggers and Queries; examples of Collection Types, Triggers, and Collection Queries are presented in the following table, Table 2.

| Collection Type | Trigger | Collection Query | name |
|---|---|---|---|
| People-Based | random; time interval before birthday/Event associated Person | Photographs containing (via human or OCR identification) person A; Photographs containing person A at time X, where X is a birthday/Event associated with person A | name of person A |
| Event | time interval before Event or Event anniversary (typically 14 days) | Photographs at Event location; Photographs at date-time X, where X is a date-time associated with Event (birthdays/anniversary are also Events) | event name |
| Current Location-Based | user check-in, provides current location | photographs by user at/near current location | Current-location name |
| Location-Based | user created | photographs at location X, where X specified (or selected) by user | name of location X |
| New Media | new media upload; current location; time interval (such as 14 days) before anniversary of collection creation date/upload date | Photographs within time interval (example: 14 days) of current day-time OR time interval of current day-time with sub-groups by location | "New media" |
| Permanent | media import | last X photographs, where X is an integer (like 100) | "Permanent" |
| Online Services | media import; random | last X photographs imported into Online Service A | name of Online Service |
| Seasonal-Holiday | current day-time falling in time interval (typically 14 days) before Seasonal-Holiday anniversary | Photographs at date-time X, where X is a date-time associated with Seasonal-Holiday Event | name of Seasonal-Holiday Event |
| Helper | more than X faces are unidentified in User Photographs | Photographs containing faces X, where X are unidentified faces | "hey stranger" |
| Random | random selection of Query, not recently executed | query of selected Collection Type | name of selected Collection Type |

Normalized Location Data 137 may be associated with User Profiles 131, Photographs 132, Photo Categorization Data 138, Photo Metadata 133, Contact Information 134, Events 135, and Locations 136.

Photo Categorization Data 138 may be a part of Photo Metadata 133 and 122. Photo Categorization Data 138 may comprise, for example, database entries representing or encoding a name or identifier, a name or identifier of a person or place, a name or identifier of a photographer, a name or identifier of a person in a photograph, an album name, a folder name, a name assigned to a group of Photographs 132, a Collection Types 139, an indication that a Photograph 132 is part of a User Collection 141, an indication that a Photograph 132 which is part of a User Collection 141 is hidden or visible, and indicating the priority of a User Collection 141. Photo Categorization Data 138 may be associated with User Profiles 131, Photographs Collection Queries 140 and 124 are queries executed by the Server Curation Application 126 or Client Curation Application 106, following the occurrence of a Trigger, the output of which is stored in Photo Categorization Data 138 and 121 and which output is then used to gather Photographs which comprise User Collections 141 and Collections 108. Collection Queries are summarized in Table 2.

User Collections 141 are triggered by the Triggers in Table 2 and are composed by the output of Collection Queries 140 relative to a set of Photographs 132 associated with a User Profile 131. Collections 108 are User Collections 141 as transmitted to and stored by the Client Curation Application 106 and/or they are the output of Collection Queries 124 relative to the User Photographs 119. Collections 108 are rendered on or output at the Client Device 105 by the Client Curation Application 106, as discussed further below.

A subset of or equivalent entries to the information in the Database 130, as discussed herein, may be maintained in a database, datastore, or otherwise in files on the Client Device 105.

Also illustrated as being connected to the Network 120 are the Client Device 105 and the Mobile Computer 110. The Client Device 105 and Mobile Computer 110 are computing devices which, generally, should be understood to be equivalent; the principle distinction between the two being that Mobile Computer 110 may be more portable than Client Device 105. As illustrated, a communication connection may exist directly between the Client Device 105 and the Mobile Computer 110, as well as between each and the Network 120. All references herein to the Client Device 105 and/or to the Mobile Computer 110 should be understood to refer to both or either. Components illustrated as occurring within the Client Device 105 should be understood as also occurring within the Mobile Computer 110.

The Client Device 105 is illustrated as comprising data comprising Collections 108, User Contacts 111, User Location 112, User Events 114, User Photographs 119, Photo Categorization Data 121, Photo Metadata 122, Collection Types 123, and Collection Queries 124 as well as software routines for a Client Curation Application 106, a Browser 107, a Communications Application 109, and a Photo Application 113.

The Collections 108 comprise curated collections of photographs, such as of User Photographs 119, formed by instructions, data or information (received from the Server Curation Application 126 or generated by the Client Curation Application 106) utilized by the Client Curation Application 106 to organize the User Photographs 119 into the Collections 108. The instructions, data or information may be part of Photo Categorization Data 121 and/or Photo Metadata 122 (corresponding to Photo Categorization Data 138 and Photo Metadata 133). The Client Curation Application 106 and Collections 108 are discussed at length herein.

The Browser 107 may be a web-browsing application which may render web pages obtained from, for example Web Server 127 and 116. The Communications Application 109 may be a communications software application which sends and receives, for example, email, text messages, voice and video calls, and similar. Examples of Communications Applications 109 include Microsoft, Inc.'s OUTLOOK® and SKYPE® programs and services, Apple, Inc.'s MAIL, ADDRESS BOOK, and IMESSAGE® programs and services, Google, Inc.'s GMAIL® programs and services. The Communications Application 109 may store or have access to the User Contacts 111 and User Events 114. The Photo Application 113 may be a routine for storing and managing digitally encoded photographs, such as Apple, Inc.'s IPHOTO® program and service or Google, Inc.'s PICASA® program and service. The Communications Application 109 and/or Photo Application 113 may comprise a plug-in or other routine which operates with the Browser 107 to obtain similar communications or photo managing services from a third party, such as the 3$^{rd}$ Party Server 115. The Communications Application 109 may contain or have access to data and/or information such as User Contacts 111 and User Events 114. The Communications Application 109, the Client Curation Application 106, and/or other routines on the Client Device 105 may contain or have access to the User Location 112, which may be obtained from a GPS, wifi- or network-based location determining routine or service, or user input.

Also illustrated as being connected to the Network 120 is a 3$^{rd}$ Party Server 115. The 3$^{rd}$ Party Server 115 may provide services to the Client Device 105, such as social network services (such as Facebook, Inc.'s FACEBOOK® service, Google, Inc.'s GOOGLE®+ service), online storage services (such as Google, Inc.'s PICASA® service or Apple, Inc.'s ICLOUD® service), and services which support the Communications Application 109 (such as email servers, phone servers, and similar). Services provided by the 3$^{rd}$ Party Server 115 are referred to herein as "Online Services." The 3$^{rd}$ Party Server 115 is illustrated as comprising data comprising User Contacts 117 and User Content 118, as well as software routines for a Web Server 116.

Figure 2:
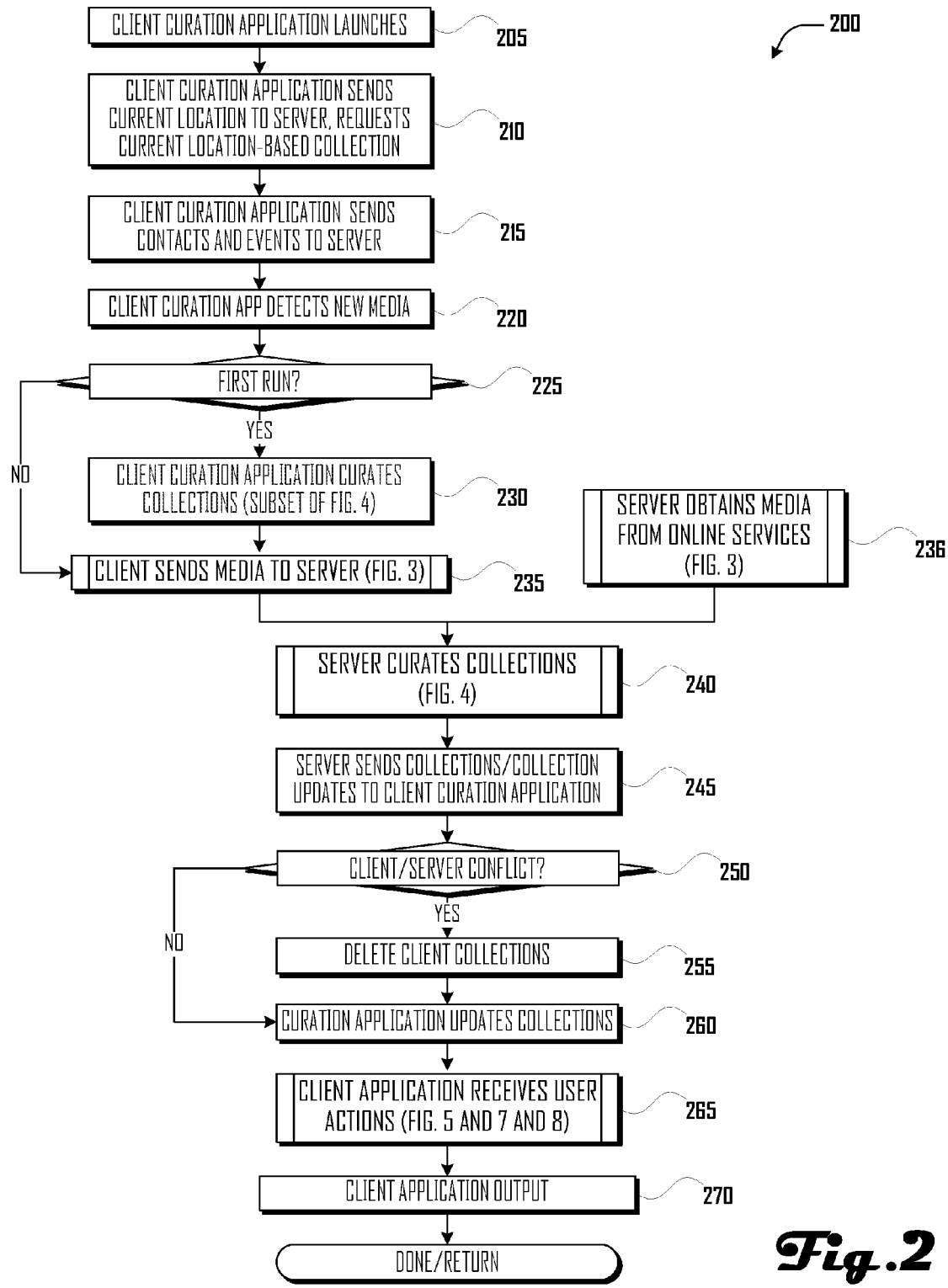
FIG. 2 is a flowchart illustrating an overview of a process in which a Client Curation Application 106 interacts with the Server Curation Application 126.

FIG. 2 is a flowchart illustrating an overview of a process 200 in which a Client Curation Application 106 interacts with the Server Curation Application 126. At step 205, the Client Curation Application 106 launches or executes in the Client Device 105. Not shown, the Client Device 105 and/or the Client Curation Application 106 may login to the Server 125 and the Server Curation Application 126, such as by providing login credentials to authenticate and authorize the Client Device 105 and/or the Client Curation Application 106 with respect to a user account, as may be recorded in a User Profile 131.

At step 210, the Client Curation Application 106 obtains and sends the User Location 112 of the Client Device 105 (which, as discussed above, may be a Mobile Computer 110) to the Server 125 and the Server Curation Application 126. Transmission of the User Location 112 may be treated as a request for, or the Client Curation Application 106 may separately request, the Current Location-Based Collection (as illustrated at step 210 in FIG. 2).

At step 215 the Client Curation Application 106 sends User Contacts 111 and User Events 114 to the Server Curation Application 126; this transmission may be limited to changes in such records since the last time the User Contacts 111 and User Events 114 were sent. The Server Curation Application 126 may store and/or update records comprising the User Contacts 111, User Events 114, and User Location 112 in the Database 130, as Contact Information 134, Events 135, and Locations 136.

At step 220, the Client Curation Application 126 may detect that new media, such as photographs, have been imported into or added to, for example, the Photo Application 113. Detection of new media may comprise requesting and receiving information from, for example, the Photo Application 113, regarding the number and organization of photographs in the Photo Application 113. In this context, "new media" should be understood to include both new photographs as well as new ways the photographs in the Photo Application 113 are organized, such as if new folders or albums or similar were created in the Photo Application 113 by the user or by the Photo Application 113.

At step 225, a determination may be made by the Client Curation Application 126 regarding whether this is the first time that the Client Curation Application 126 has been executed. If it is, then at step 230, the Client Curation Application 126 curates collections of photographs, which may be stored as Collection 108. The process performed by the Client Curation Application 126 to curate the Collections 108 may similar to the process performed by the Server Curation Application 126, illustrated in FIG. 4, but limited to a subset of the Collection Types 123, such as the Event Collection and the Permanent Collection. These processes are discussed further in relation to FIG. 4. The Client Curation Application 126 performs this local curation of Collections 108 to provide the user with the Collections 108 without having to wait for the Server Curation Application 126 to curate the User Collections 141 and to download the User Collections 141 as Collections 108. As discussed below in relation to steps 250 and 255, if the Server Curation Application 126 prepares User Collections 141 based on the same Collection Types 139 as already prepared by the Client Curation Application 106, then the Collections 108 prepared by the Client Curation Application 126 are deleted when the corresponding User Collections 141 are downloaded from the Server Curation Application 126 and the Client Curation Application 106 flags or otherwise internally notes that it is no longer to perform the local Collection curation for some or all of the Collection Types 139 performed by the Server Curation Application 126.

At step 235, which may follow step 225 if it was determined that this was not the first run of the Client Curation Application 106, the Client Curation Application 106 transmits media, such as User Photographs 119, to the Server Curation Application 126. At step 236, the Server Curation Application 126 obtains media, such as photographs in User Content 118, from Online Services. Steps 235 and 236 are further illustrated and discussed in and in relation to FIG. 3 as Client Sends Media to Server and Server Obtains Media From Online Services Routines 300.

Figure 4:
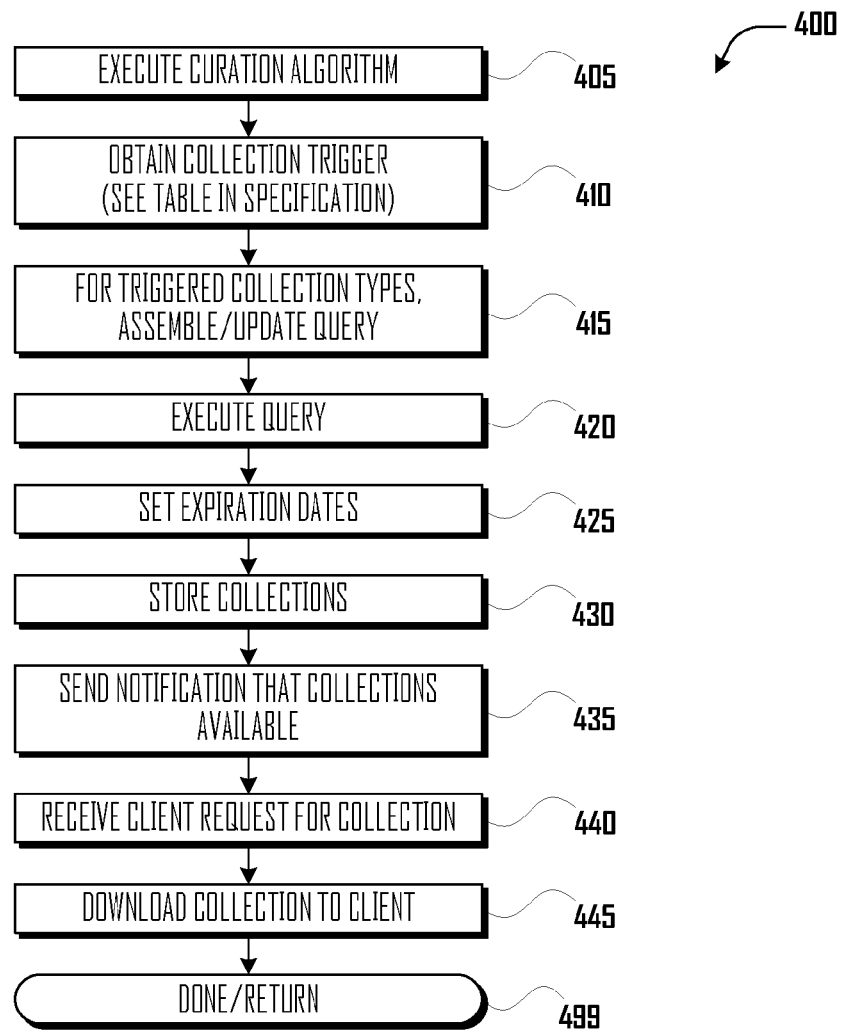
FIG. 4 is a flowchart illustrating details of part of the process illustrated in FIG. 2, in which the Server Curation Application 126 curates Collections.

At step 240, the Server Curation Application 126 curates Collections as User Collections 141. Details of this step are illustrated in FIG. 4. At step 245, the Server Curation Application 126 sends the curated User Collections 141 and/or incremental updates to the User Collections 141 to the Client Curation Application 106, where they may be received and stored as Collections 108. Sending the User Collections 141 (and/or updates thereto) may further comprise sending a notice to the Client Curation Application 106 that the Collections 141 (and/or updates thereto) are available to be downloaded and then receiving a "transmit" or similar instruction from the Client Curation Application 106.

As discussed above, at step 250 the Client Curation Application 106 may determine whether the Client Curation Application 106 has prepared a User Collection 141 based on the same Collection Types 139 as prepared by the Server Curation Application 126. If so, then at step 255 the Collections 108 prepared by the Client Curation Application 126 are deleted when the corresponding User Collections 141 are downloaded by the Server Curation Application 126 and the Client Curation Application 106 flags or otherwise internally notes that it is no longer to perform the local Collection curation for some or all of the Collection Types 139 performed by the Server Curation Application 126.

At step 260, the Client Curation Application 106 updates the Collections 108 with the User Collections 141 transmitted by the Server Curation Application 126 at step 245. The Client Curation Application 106 may render the Collections 108 in the Client Device 105.

Figure 5:
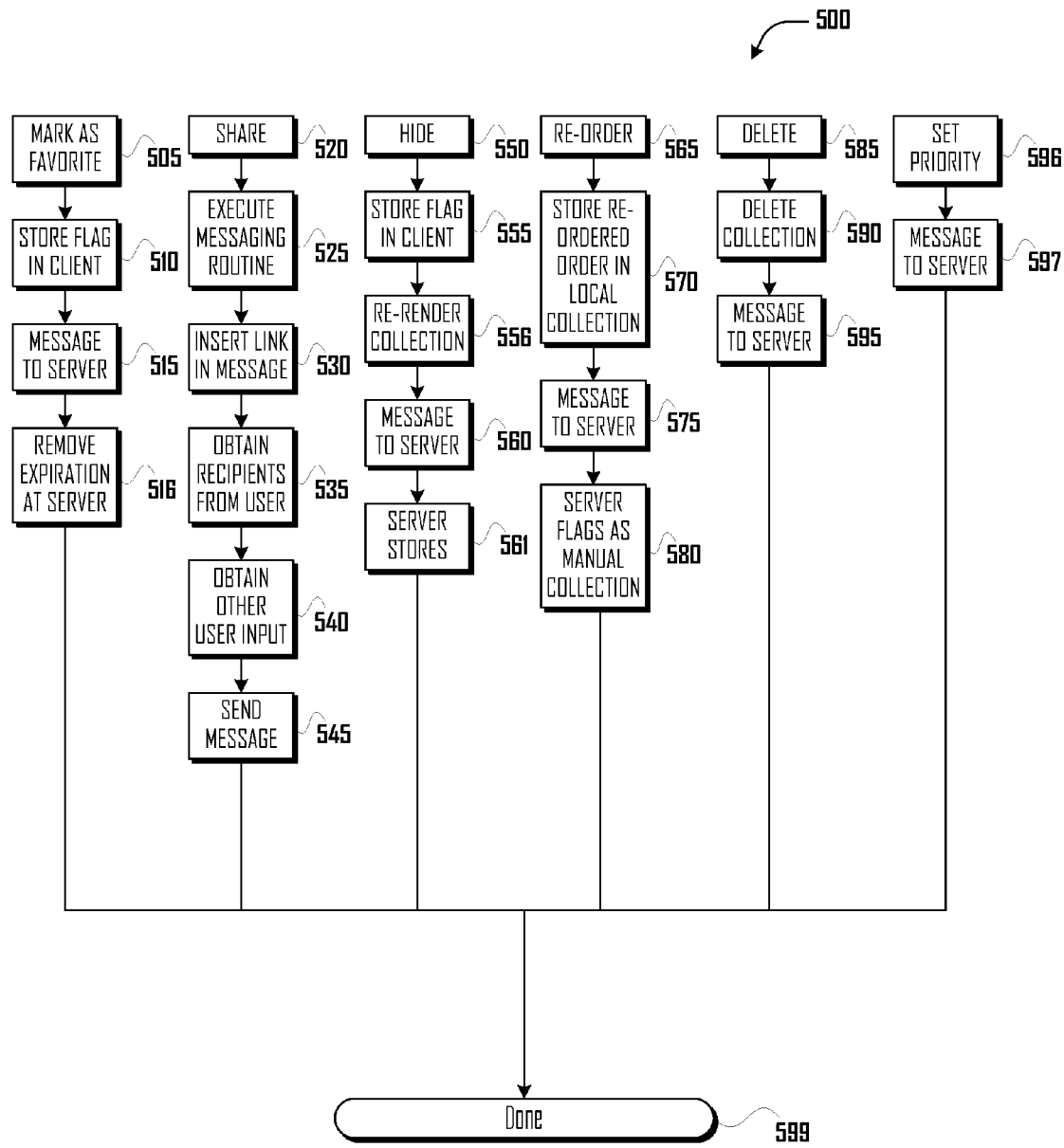
FIG. 5 is a flowchart illustrating details of part of the process illustrated in FIG. 2.
Figure 7:
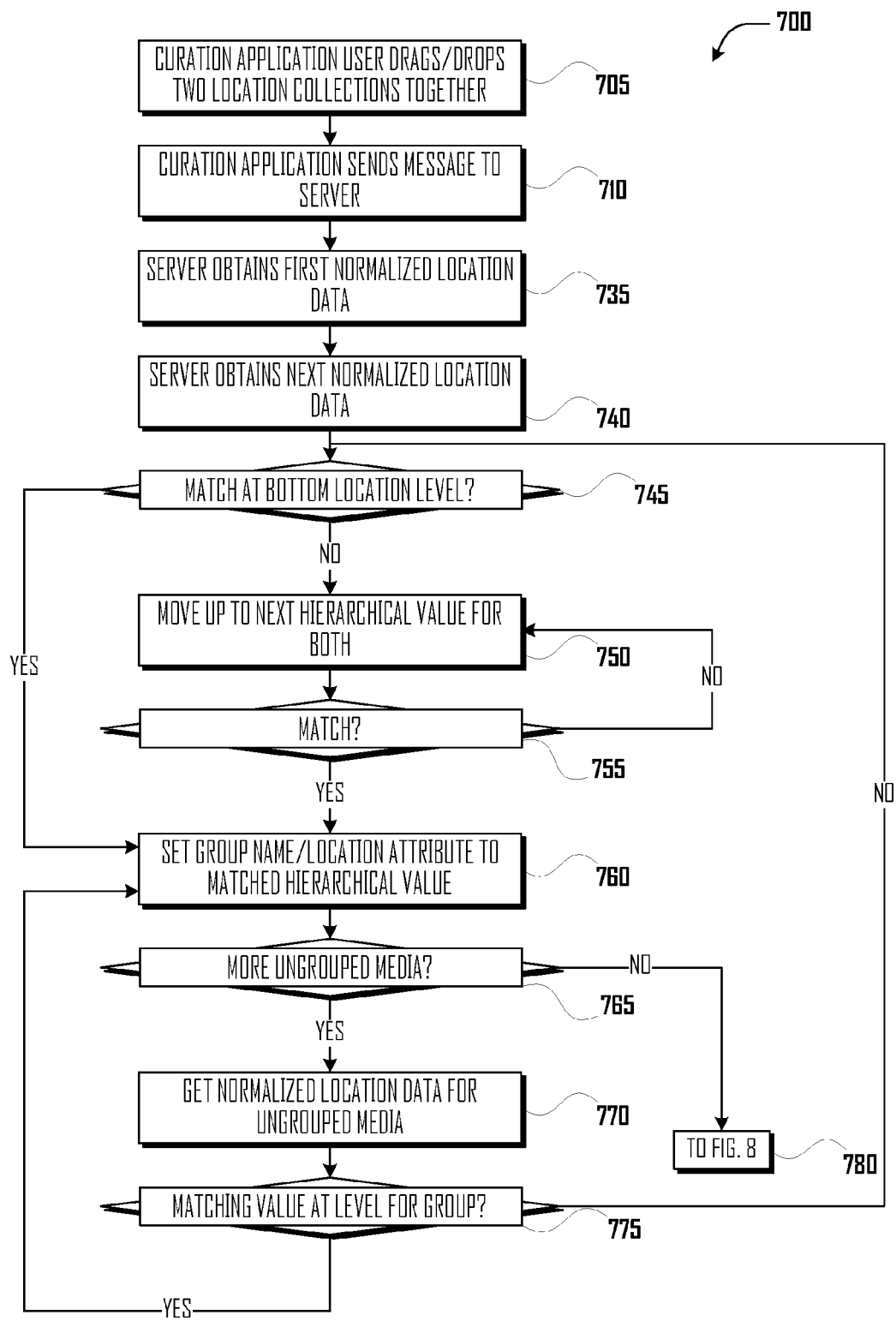
FIG. 7 is a flowchart illustrating details of part of the process illustrated in FIG. 2.
Figure 8:
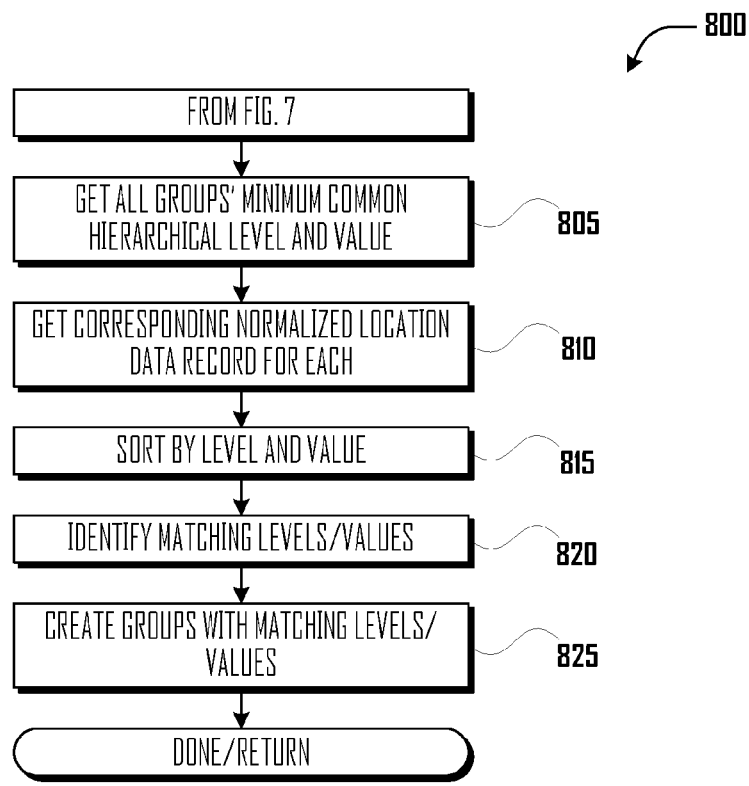
FIG. 8 is a flowchart illustrating a continuation of the process illustrated in FIG. 7.

At step 265, the Client Curation Application 106 receives user actions, such as from user input into the Client Device 105. The following are examples of user actions (among many) which may be possible with respect to Collections: Mark as Favorite, Share, Hide, Re-Order, Delete, Set Priority, and Combine Location Collections. FIGS. 5, 7, and 8 illustrate additional processes which each of these user actions may be associated with. At step 270, the Client Curation Application 106 provides output to the user, such as rendering the Collections 108 and/or output related to the user actions received at step 265.

Figure 3:
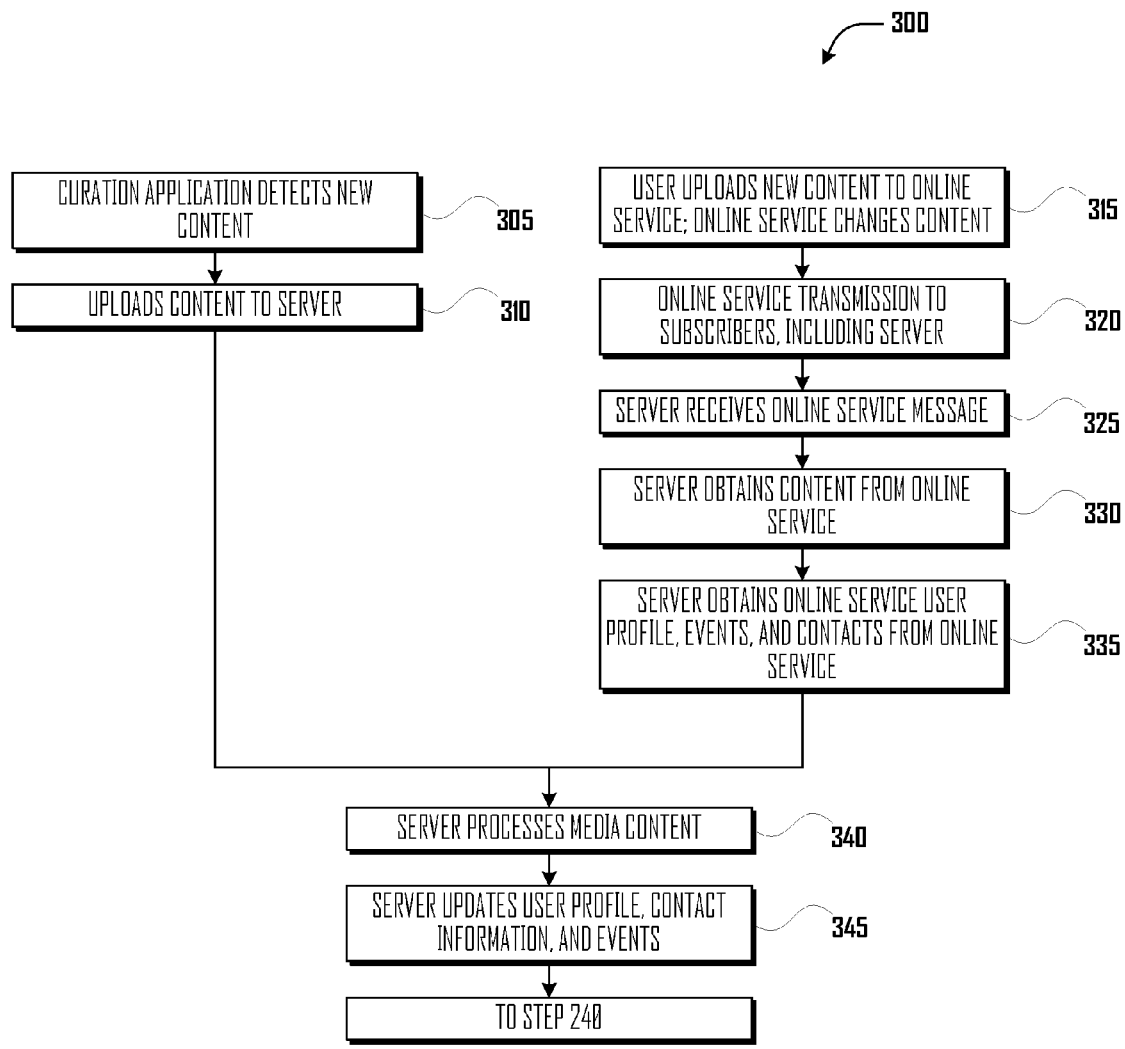
FIG. 3 is a flowchart illustrating details of part of the process illustrated in FIG. 2.

FIG. 3 is a flowchart illustrating details of part of the process illustrated in FIG. 2, Client Sends Media to Server and Server Obtains Media From Online Services Routines 300. At step 305, the Client Curation Application 106 has detected new media (described above in relation to step 220) and, at step 310, uploads the new media to the Server Curation Application 126. At step 315, the user has uploaded new media content to an Online Service and/or the Online Service has changed the user's content in the Online Service. It should be understood that changing the content may comprise additional media, such as photographs, added to the Online Service and associated with the user, as well as changes in the organization of content (associated with the user) on the Online Service. At step 320, the Online Service has optionally transmitted a message to those who have subscribed to or otherwise have permission to receive notifications regarding the user's account with the Online Service that new content (or reorganized content) associated with the user is at the Online Service. The message may be sent as an email, a "tweet," a response to an API command issued by the Server Curation Application 126, or similar, in a "push" or "pull" manner. At step 325, the Server Curation Application 126 optionally receives the message of step 320.

At step 330, the Server Curation Application 126 obtains User Content 118 containing media and photographs from the Online Service. Obtaining the media may involve a process in which the Server Curation Application 126 presents credentials to the Online Service, which credentials authenticate and authorize the Server Curation Application 126 to obtain the media from the Online Service. The credentials may have been received in a process, not shown, in which the user of the Client Curation Application 106 authorized the Server Curation Application 126 to obtain the media from the Online Service and in which the Online Service authenticated the Server Curation Application 126.

At step 335, the Server Curation Application 126 optionally obtains from the Online Service the User Profile 150, User Contacts 117, and User Events 151 associated with the user. The User Profile 150 and Events 151 may be used to update the Server Curation Application's 126 User Profile 131, Contact Information 134, and Events 135 associated with the User Profile 131 of the user, such as at step 345.

At step 340, the Server Curation Application 126 processes the media received at steps 310 and/or steps 330. Processing the media may involve saving data equivalent to Photo Metadata 133 and Photo Categorization Data 138 which may be received in conjunction with the media. For example, the Online Service may identify people, by name or by another identifier, which people have been identified in the media by the Online Service (such as by facial recognition) or by users of the Online Service; by way of further example, the Online Service or the Client Curation Application 106 may identify folders (or similar) into which the user has organized the media; by way of further example, the Online Service or the Client Curation Application 106 may provide the shutter speed, a time-stamp, or similar, associated with the media. This information may be provided in conjunction with the media. The media and this information may be identified, parsed, and stored in the Database 130 in the records discussed above. Processing the media may further comprise performing facial recognition on the media by the Server Curation Application 126.

FIG. 4 is a flowchart illustrating details of part of the process illustrated in FIG. 2, in which the Server Curation Application 126 curates Collections 141, Server Curates Collections Routine 400. At step 405, execution of the Curation Algorithm is begun or continues. At step 410, the Server Curation Application 126 obtains or notes Triggers which have occurred in relation to the different Collection Types 139. Triggers may be processed in batches or may be processed as they occur. The Server Curation Application may register Events 135, Contact Information 134, Locations 136, Photographs 132, and Photo Categorization Data 138 and may set a Trigger to occur when a Photograph 132 is associated with an anniversary of an Event, when a person is identified in a Photograph 132 (which person may be identified in the Contact Information 134), when an unidentified person is detected in a Photograph 132 (such according to the output of a facial recognition process), and otherwise according to the Triggers identified above in Table 2.

At step 415, if not done previously, the Collection Queries 140 corresponding to the triggered Collection Types 139 are accessed, assembled, updated as necessary (to include any additional information or parameters which may be associated with the Collection Triggers), and stored, for example as Collection Queries 140. At step 420, the Collection Queries 140 are executed against the Database 130 to assemble the User Collections 141.

At step 425, expiration dates for the User Collections 141 may be set, such as to set an expiration date of 30 to 60 days after a New Media or Online Media Collection Type query is executed (such that the "expired" User Collection 141 will not be downloaded to the Client Curation Application 106 after a certain date or will no longer be visible via the Client Curation Application 106 after a certain date, if already downloaded to the Client Curation Application 106).

At step 430, the Collections are stored, for example, as User Collections 141 in the Database 130. The User Collections 141 may be stored as, for example, records in the Database 130, such as records in the Photo Categorization Data 138, which records indicate to the Client Curation Application 106 that the Photographs 132 are part of User Collections 141.

At step 435, the Server Curation Application 126 may send a notification that the User Collections 141 are available. The notification may be a message to the Client Curation Application 106 that the User Collections 141 are available, prompting the Client Curation Application 106 to download the User Collections 141 as Collections 108 or the notification may be an email or other communication (which may be rendered by the Client Curation Application 106) to the user of the Client Curation Application 106, informing the user that the User Collections 141 are available to be downloaded or otherwise accessed, which may require further user action to then download or otherwise access the User Collections 141.

At step 440, a request from a Client Curation Application 106 for a User Collection 141 may be received and, at step 445, the User Collections 141 may be downloaded to the Client Curation Application 106. Download of the User Collections 141 may be an incremental download of changes in the User Collections 141 since the last time the User Collections 141 were downloaded. Download of User Collections 141 may include Photographs 132 which comprise the User Collections 141. Download of User Collections 141 may not include Photographs 132 which are already on the Client Device as User Photographs 119.

FIG. 5 is a flowchart illustrating details of part of the process illustrated in FIG. 2, namely, certain steps taken in response to certain user actions, such as marking a Collection as a favorite, sharing a Collection, hiding a picture within a Collection, re-ordering a Collection, deleting a Collection, and setting the priority of a Collection, Client Application Receives User Actions Part One 500. The user actions may be implemented by graphical control elements in the user interface for the Client Curation Application 106.

At step 505, a user of the Client Curation Application 106 has marked a Collection 108 as a favorite. At step 510, the Client Curation Application 106 stores this indication, such as in a database accessible by the Client Curation Application 106 in the Client Device 105. The Client Curation Application 106 may then remove or ignore an expiration, if any, set with respect to the Collection 108. At step 515, the Client Curation Application 106 sends a message to the Server Curation Application 126 informing the Server Curation Application 126 that the user has marked the Collection as a favorite. At step 516, the Server Curation Application 126 may then remove any expiration, if any, which may be set with respect to the Collection.

At step 520, the user of the Client Curation Application 106 has input a "share" instruction in relation to a Collection 108. At step 525, the Client Curation Application 106 may invoke a messaging routine. The messaging routine may be a native part of the Client Curation Application 106 or it may be a third-party messaging routine which is invoked by the Client Curation Application 106. For example, a native or third-party routine may be an email application, an application which opens a browser and logs into an Online Service on behalf of the user, or another communication application, such as Communication Application 109. After invoking the messaging routine and opening a message, the Client Curation Application 106 inserts into the message a hyperlink to the Collection 108, as the Collection 108 may be found at or via the Server Curation Application 126 among the User Collections 141. The link may be generated by the Client Curation Application 106 or it may be requested by the Client Curation Application 106 and provided by the Server Curation Application 126. At step 535, if not performed earlier, the messaging routine may obtain recipients of the message from the user. The recipients may be input in the form of, for example, email addresses, user names, handles, login identifiers, or other identifiers used by the messaging routine. At step 540, other user input may be obtained in relation to the message, such as text which the user may wish to accompany the message, such as, "Check out this great collection of photos!" At step 545 the message may be sent. Sending the message may be directed or initiated by the Client Curation Application 106 or the user may be required to press a "send" button or similar in an email client or other third-party messaging routine. Upon receipt and opening of the message, the recipient may click on or otherwise follow the hyperlink to obtain, view, or download the User Collection 141, such as into a Client Curation Application 106 executed by the recipient.

At step 550, a "hide" or "unhide" user action in the Client Curation Application 106 is received, which user action instructs the Client Curation Application 106 to hide or unhide a photograph, such as User Photograph 119, in a Collection 108. At step 555, the Client Curation Application 106 stores this indication, such as in an entry in a database accessible by the Client Curation Application 106 in the Client Device 105. The database entry may be in a record in the Photo Categorization Data 121.

At step 556 the Client Curation Application 106 may re-render the Collection 108, to hide or unhide the flagged photograph. The Client Curation Application 106 may include two views of the Collection 108, one in which all photographs are shown (whether "hidden" or not) and one in which only non-hidden photographs are shown. The Client Curation Application 106 may provide that the user can unhide all previously hidden photographs in a Collection 108. At step 560, the Client Curation Application 106 may send a message to the Server Curation Application 126. The message may instruct the Server Curation Application 126 to flag the Photograph 132 in the corresponding User Collection 141 as a photograph which should not be downloaded to the Client Curation Application 106 or which may be downloaded, but with an instruction to the Client Curation Application 106, such as in the Photo Categorization Data 138, not to render the photograph. The Server Curation Application 126 may then, at step 561, store the indication of the command in, for example the Database 130, such as in the Photo Categorization Data 138.

At step 565 a "re-order" user action in the Client Curation Application 106 is received, which user action instructs the Client Curation Application 106 to re-order the photographs in a Collection 108. At step 570 the re-ordered order of the photographs in the Collection 108 is stored. At step 575, the Client Curation Application 106 may send a message to the Server Curation Application 126; the message may instruct the Server Curation Application 126 to flag the Collection 108 as a manual collection. At step 580, the Server Curation Application 126 may then flag the Collection 108 as a manual collection.

At step 585, a "delete" user action in the Client Curation Application 106 is received, which user action instructs the Client Curation Application 106 to delete a Collection 108. At step 590, the Client Curation Application 106 deletes the Collection 108, which may comprise updating records in, for example, the Photo Categorization Data 121 to indicate that the Collection 108 should no longer be displayed. While the Collection 108 may be deleted, the User Photographs 119 within the Collection 108 may not be deleted. At step 595, the Client Curation Application 106 may send a message to the Server Curation Application 126 to indicate that the Collection 108 was deleted; the message may cause the Server Curation Application 126 to discontinue curating the User Collection 141 corresponding to the deleted Collection 108.

At step 596, a "set priority" user action in the Client Curation Application 106 is received, which user action instructs the Client Curation Application 106 to change the priority of a Collection 108. The priority of a Collection 108 may be saved, for example, in the Photo Categorization Data 121. The Collections 108 may have priorities of, for example, "high," "medium," and "low." The priority of Collections 108 may also be determined by the Server Curation Application 126, as the Server Curation Application 126 downloads Photo Categorization Data 138 to the Client Curation Application 106. The Client Curation Application 106 may include display output which filters and/or orders displayed Collections 108 based on the assigned priority of the various Collections 108. For example, an "all" display filter may display all Collections 108, but with "high" priority Collections 108 displayed before lower priority Collections 108 and with Collections 108 within each category displayed by creation (or update) date. A "high" display filter may display only Collections 108 which have a "high" priority. At step 597, the Client Curation Application 106 may send a message to the Server Curation Application 126. At step 599, the Client Application Receives User Actions Part One 500 routine may be done.

Not shown in FIG. 5, a user action may also combine two Location-Based Collections 108 together, such as by dragging-and-dropping the two Collections 108 together. This user action is discussed further below in relation to FIGS. 7 and 8.

Figure 6:
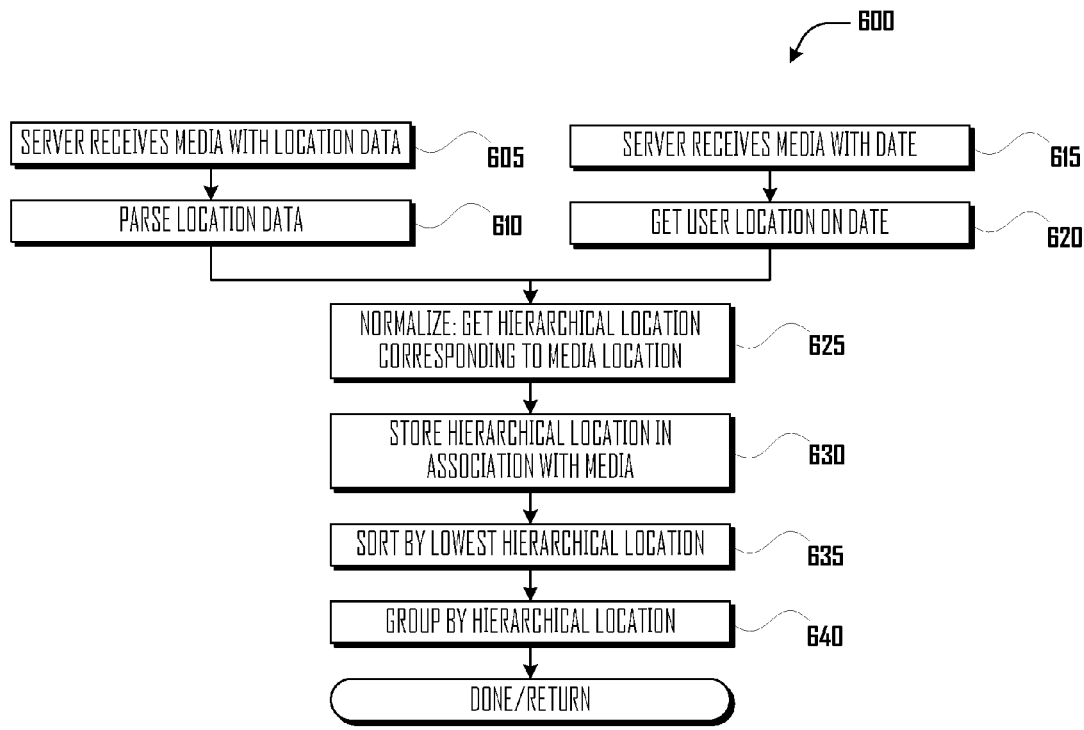
FIG. 6 is a flowchart illustrating a process in which a server normalizes location data into a hierarchical location data structure.

FIG. 6 is a flowchart illustrating a process in which a server normalizes location data into a hierarchical location data structure, Server Normalizes Location Data 600. Normalization of location data may proceed when the Server Curation Application 126 receives Photographs 132, Photo Metadata 133, Contact Information 134, Events 135, and Locations 136 or at other times when the Server Curation Application 126 receives an address or location information. As illustrated, at step 605, the Server Curation Application 126 receives media, such as a Photograph 132, containing or associated with location information (via an association with one of the records discussed above), such as an address or a latitude and longitude. At step 610, the Server Curation Application 126 parses the location information from the media or otherwise obtains the location information associated with the media. At step 615, the Server Curation Application 126 receives media, such as a Photograph 132, containing or associated with a date or time-stamp. At step 620, the Server Curation Application 126 obtains a user location associated with the date or time-stamp. This step may involve looking up the date or time-stamp in database records associated with the user and determining that the date or time-stamp or a time range surrounding the date or time-stamp is associated with a location.

At step 625, the Server Curation Application 126 obtains a Normalized Location Data 137 record corresponding to the location obtained from the media. The Normalized Location Data 137 record may be selected based on a best-match correspondence between the location information obtained from the media and a set of Normalized Location Data 137 records. At step 630, the obtained Normalized Location Data 137 record may be stored or otherwise associated with the media, such as with Photograph 132. At step 635, the Normalized Location Data 137 records associated with Photographs 132 may be sorted, starting at lowest hierarchical location elements. At step 640, groups of Photographs 132 with common hierarchical location elements in the associated Normalized Location Data 137 records may then be identified.

FIG. 7 is a flowchart illustrating details of part of the process illustrated in FIG. 2, relating to determining a common location element for a group of photographs, Client Application Receives User Actions Part Two 700. At step 705, a user action combines two Location-Based Collection Types 139 (such as by dragging-and-dropping two icons (or other graphical objects) representing the Location-Based Collection Types into an overlapping or proximate position in a display in the Client Device 105 in the Client Curation Application 106) or a user action includes two or more User Photographs 119 in a folder or other grouping ("folder"). The folder may be assigned a name or may be organized in a set based on a location found to be common to the User Photographs 119. At step 710, the Client Curation Application 106 may send a message to the Server Curation Application 126, which message indicates that the two Location-Based Collection Types have been combined by the user action. Alternatively, the process may be conducted at the Client Curation Application 106.

At step 735, the Client Curation Application 106 or Server Curation Application 126 obtains the Normalized Location Data 137 record (or equivalent record on a Client Device 105) associated with the first Location-Based Collection Type or User Photograph 119 or Photograph 132. At step 740, the Client Curation Application 106 or the Server Curation Application 126 obtains the Normalized Location Data 137 record (or equivalent record on a Client Device 105) associated with the second Location-Based Collection Type or User Photograph 119 or Photograph 132.

At step 745, the Client Curation Application 106 or the Server Curation Application 126 determines whether there is a match at the bottom level of the two Normalized Location Data records. If there was not a match, then at step 750 the process may move up one level in the two Normalized Location Data records and then, at step 755, determine if there is a match. If there is not a match, then the process may return to step 750. If there is a match, then the process may proceed to step 760. Alternative to steps 745 through 755, the two Normalized Location Data records may be sorted, starting at lowest hierarchical location elements, and the lowest common hierarchical location elements then identified. At step 760, the folder name, name assigned to the combined Location-Based Collection Type, or other location attribute associated with the group is set to be or is set to comprise the matched value from the Normalized Location Data 137 records.

At step 765, a determination may be made regarding whether more media, such as a User Photograph or Location-Based Collection Type, has been added to the folder or group discussed in relation to step 760. If step 765 is affirmative, then at step 770 the Normalized Location Data record for the added media is obtained. At step 775, a determination may be made regarding whether the Normalized Location Data record has a matching value at the same level in the Normalized Location Data record as the matched level identified at step 760. If so, then the process may return to step 760. If not, then the process may return to step 745.

If no more ungrouped media was found to have been added at step 765, then the process may proceed to step 780 and FIG. 8.

FIG. 8 is a flowchart illustrating a continuation of the process illustrated in FIG. 7, in which groups of groups may be created, based on the minimum matching value from the Normalized Location Data records for the groups, Client Application Receives User Actions Part Three 800. At step 805, which may occur independently of step 765, the matched hierarchical location level and value determined at step 755 (or at an equivalent step) for each group, such as the Collection 108, User Collections 141, folders, or similar, is obtained. At step 810 the corresponding Normalized Location Data Record for each are obtained. For example, if a first group had a matched hierarchical location level of 4 with a value of "Moss Bay," then the Normalized Location Data Record for the first group would be as follows:

| level number | | |
|---|---|---|
| 1 | coordinates: | blank |
| 2 | number: | blank |
| 3 | street: | blank |
| 4 | Neighborhood: | Moss Bay |
| 5 | City: | Kirkland |
| 6 | State: | WA |
| 7 | Country: | USA |
| 8 | Continent: | North America |

If a second group had a matched hierarchical location level of 5 with a value of "Seattle," then the Normalized Location Data Record for the second group would be as follows:

| level number | | |
|---|---|---|
| 1 | coordinates: | blank |
| 2 | number: | blank |
| 3 | street: | blank |
| 4 | Neighborhood: | blank |
| 5 | City: | Seattle |
| 6 | State: | WA |
| 7 | Country: | USA |
| 8 | Continent: | North America |

At step 815, the Normalized Location Data Records obtained at step 810 are sorted by level and value. At step 820, the matching levels and values are obtained. For the example shown above, the matching levels are at level 6, with the value "WA." At step 825, new groups, folders, or organizational options may be created with the matching level/value.

Figure 9:
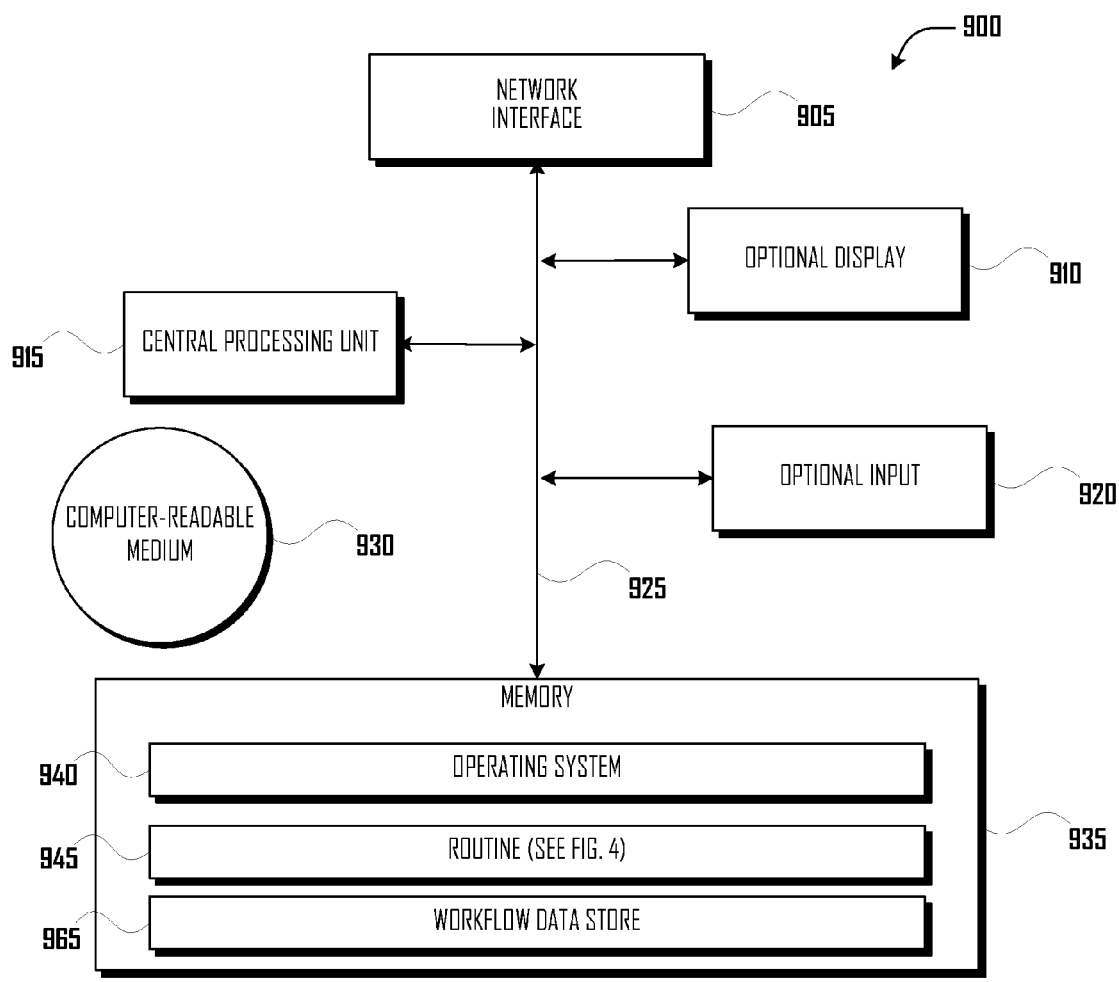
FIG. 9 is a functional block diagram of exemplary computing devices and some data structures and/or components thereof.

FIG. 9 is a functional block diagram of exemplary computing devices and some data structures and/or components thereof, such as the computing devices shown in FIG. 1. In some embodiments, the computing device 900 may include many more components than those shown in FIG. 1. However, it is not necessary that all of these generally conventional components be shown in order to disclose an illustrative embodiment. As shown in FIG. 9, the computing device 900 includes a network interface 930 for connecting to the network 120.

The computing device 900 also includes at least one processing unit 915, memory 935, and an optional display 910, all interconnected along with the network interface 905 via a bus 925. The memory 935 generally comprises a random access memory ("RAM"), a read only memory ("ROM"), and a permanent mass storage device, such as a disk drive or SDRAM (synchronous dynamic random-access memory). The memory 935 stores program code for routines 945, such as, for example, the Client Curation Application 106, the Server Curation Application 126, the Browser 107, the Communication Application 109, the Photo Application 113, or a Web Server 127 or 116 as well as email servers and database applications. In addition, the memory 935 also stores an operating system 940. These software components may be loaded from a non-transient computer readable storage medium 930 into memory 935 of the computing device 900 using a drive mechanism (not shown) associated with a non-transient computer readable storage medium 930, such as a floppy disc, tape, DVD/CD-ROM drive, memory card, or other like storage medium. In some embodiments, software components may also or instead be loaded via a mechanism other than a drive mechanism and computer readable storage medium 930 (e.g., via network interface 905).

The computing device 900 may also comprise hardware supporting optional input modalities, Optional Input 910, such as, for example, a touchscreen, a keyboard, a mouse, a trackball, a stylus, a microphone, and a camera.

Computing device 900 also comprises or communicates via bus 925 with workflow data store 965. In various embodiments, bus 925 may comprise a storage area network ("SAN"), a high speed serial bus, and/or via other suitable communication technology. In some embodiments, computing device 900 may communicate with workflow data store 965 via network interface 905.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A computer-implemented method of curating collections of digital photographs and combining at least two group of photos in a memory of a server computer, the method comprising:
receiving photographs associated with a user;
storing the photographs in a database in association with the user;
associating the photographs in the database with information identifying at least one of a date when the photograph was taken, a location where the photograph was taken, an event associated with the photograph, or a person in the photograph;
determining that a trigger has occurred for curating a type of photograph collection;
curating the type of photograph collection in response to the trigger;
obtaining a first set of hierarchically structured location information associated with a first group of photos in the assembled photograph collection;
obtaining a second set of hierarchically structured location information associated with a second group of photos in the assembled photograph collection;
determining a lowest hierarchical location element common to each of the hierarchically structured location information sets;
determining a name for a third group of photos comprising the first and second groups of photos, which name comprises the lowest hierarchical location element in common to each of the hierarchically structured location information sets;
sending, from the server computer, a notification including
the name for the third group of photos to a client device associated with the user.

2. The method of claim 1, wherein the types of photograph collections comprise at least one of a permanent collection, a current location-based collection, a location-based collection, a new media collection, an online services collection, a seasonal-holiday collection, a people-based collection, or a helper collection.

3. The method of claim 1, wherein determining that the trigger for curating the type has occurred comprises at least one of receiving location information from a user or determining that more than a specified number of unidentified people are in photographs associated with the user.

4. The method of claim 1, wherein the associating the photographs in the database with the information comprises identifying at least one of a personal anniversary associated with the user, a public holiday, a sporting event, a concert or other artistic performance, or a meeting of the user with at least one other person as the event associated with the photograph, wherein the information identifies the event.

5. The method of claim 1, further comprising performing facial recognition on the photographs in the database, wherein the associating the photographs in the database with information comprises associating the photographs in the database with information identifying the person in the photograph, and wherein associating the photographs in the database with the information identifying a person in the photograph comprises associating the photographs in the database with the output of the facial recognition.

6. The method of claim 5, further comprising obtaining a name of a person and associating the obtained name with an identifier from the output of the facial recognition.

7. The method of claim 1, wherein receiving photographs associated with the user comprises receiving the photographs from a second computer associated with the user.

8. The method of claim 1, wherein receiving photographs associated with the user further comprises receiving a notification from a computer associated with an online service that photographs associated with the user are available to be obtained from the online service, requesting the photographs from the online service, and receiving from the online service the requested photographs associated with the user.

9. The method of claim 1, further comprising obtaining at least one of third-party contact information or a current location for the user as the information and wherein the information is obtained from at least one of a client software routine associated with the user or an online service associated with the user.

10. The method of claim 9, wherein the associating the photographs in the database with information comprises identifying an event associated with the photograph and wherein the information comprises a location for the event and start- and end-dates for the event.

11. The method of claim 10, further comprising associating at least one photograph with the event based on a timestamp associated with the photograph, which timestamp falls within the start- and end-dates for the event.

12. The method of claim 1, further comprising receiving information regarding a location where the photograph was taken, normalizing the location information, and wherein associating the photographs in the database with information identifying a location where the photograph was taken comprises associating the photographs in the database with the normalized location information.

13. The method of claim 1, wherein the received photographs comprise metadata identifying at least one of a date when the photograph was taken and a location where the photograph was taken and wherein associating the media in the database with information identifying at least one of a date when the photograph was taken and a location where the photograph was taken comprises associating the photograph with the metadata in the database.

14. A computer-implemented method of curating collections of digital photographs in a first computer comprising a memory, the method comprising:
at the first computer, receiving photographs associated with a user;
at the first computer, storing the photographs in a database in association with the user;
at the first computer, associating the media in the database with information identifying at least one of a date when the photograph was taken, a location where the photograph was taken, or an event associated with the photograph;
by the first computer, transmitting the photographs and associated information to a second computer;
at the first computer, determining that the second computer has not curated a type of photograph collection;

at the first computer, assembling the type of photograph collection by:
- querying the database with a query associated with the type of photograph collection, which query comprises at least a portion of the identifying information
- obtaining a first set of the hierarchically structured location information associated with a first group of photos in the photographs in the database,
- obtaining a second set of the hierarchically structured location information associated with a second group of photos in the photographs in the database,
- determining a lowest hierarchical location element common to each of the hierarchically structured location information sets,
- determining a name for a third group of photos comprising the first and second groups of photos, which name comprises the lowest hierarchical location element in common to each of the hierarchically structured location information sets; and
- storing the result of the query in the database as the type of assembled photograph collection; and at the first computer, outputting the type of photograph collection in a user interface in the first computer.

15. The method according to claim 14, further comprising, receiving an instruction from the second computer to no longer curate the type of photograph collection.

16. The method according to claim 15 wherein the instruction comprises a notification that the type of curated collection is available from the second computer.

17. A computer-implemented method of curating collections of digital photos and combining at least two groups of photos in a memory of a server computer, the method comprising:
- receiving, at the server computer, an instruction from a client computing device associated with a user to combine at least a first and a second group of photos in a database associated with the user into a third group stored at the server computer;
- associating the photos in the database with information identifying at least one of a date when the photo was taken, a location where the photo was taken, an event associated with the photo, or a person in the photo;
- determining that a trigger has occurred for curating a type of photo collection;
- curating the type of photo collection in response to the trigger;
- obtaining, at the server computer, a first set of hierarchically structured location information associated with the first group of photos in the assembled photo collection;
- obtaining, at the server computer, a second set of hierarchically structured location information associated with the second group of photos;
- determining, at the server computer, the lowest hierarchical location element common to each of the hierarchically structured location information sets;
- determining, at the server computer, a name for the third group comprising the lowest hierarchical location element in common to each of the hierarchically structured location information sets; and
- sending a notification including the determined name from the server computer to the client computing device associated with the user.

18. The method of claim 17, further comprising obtaining normalized location information associated with the first and second groups, which normalized location information has a hierarchical structure corresponding to geographic units.

* * * * *